(12) United States Patent
Luo et al.

(10) Patent No.: US 11,237,833 B2
(45) Date of Patent: Feb. 1, 2022

(54) MULTIPLY-ACCUMULATE INSTRUCTION PROCESSING METHOD AND APPARATUS

(71) Applicant: Alibaba Group Holding Limited, Grand Cafyman (KY)

(72) Inventors: Jiahui Luo, Hangzhou (CN); Zhijian Chen, Hangzhou (CN); Yubo Guo, Hangzhou (CN); Wenmeng Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/845,606

(22) Filed: Apr. 10, 2020

(65) Prior Publication Data

US 2020/0326946 A1 Oct. 15, 2020

(30) Foreign Application Priority Data

Apr. 12, 2019 (CN) .......................... 201910292663.8

(51) Int. Cl.
*G06F 9/30* (2018.01)
*G06F 7/544* (2006.01)
*G06F 7/523* (2006.01)

(52) U.S. Cl.
CPC .......... *G06F 9/30098* (2013.01); *G06F 7/523* (2013.01); *G06F 7/5443* (2013.01); *G06F 9/3001* (2013.01); *G06F 9/30094* (2013.01); *G06F 9/30145* (2013.01)

(58) Field of Classification Search
None
See application file for complete search history.

(56) References Cited

U.S. PATENT DOCUMENTS 5,241,492 A * 8/1993 Girardeau, Jr. ........... G06F 7/57
708/523
5,793,654 A * 8/1998 Doshi ..................... G06F 5/012
708/209

(Continued)

*Primary Examiner* — Eric Coleman

(57) ABSTRACT

The present invention discloses an instruction processing apparatus, comprising a first register adapted to store first source data, a second register adapted to store second source data, a third register adapted to store accumulated data, a decoder adapted to receive and decode a multiply-accumulate instruction, and an execution unit. The multiply-accumulate instruction indicates that the first register serves as a first operand, the second register serves as a second operand, the third register serves as a third operand, and a shift flag. The execution unit is coupled to the first register, the second register, the third register, and the decoder, and configured to execute the decoded multiply-accumulate instruction so as to acquire the first source data from the first register and acquire the second source data from the second register, perform a multiplication operation on the first source data and the second source data so as to obtain a multiplication result, shift the multiplication result according to the shift flag, and add the shifted multiplication result and the accumulated data in the third register so as to obtain a multiply-accumulate result. The present invention further discloses a corresponding instruction processing method, a computing system, and a system on chip.

24 Claims, 10 Drawing Sheets

(56) References Cited

U.S. PATENT DOCUMENTS

| | | | | |
|---|---|---|---|---|
| 5,978,822 | A * | 11/1999 | Muwafi | G06F 5/015 |
| | | | | 708/209 |
| 5,983,256 | A * | 11/1999 | Peleg | G06T 1/20 |
| | | | | 708/523 |
| 7,036,106 | B1 * | 4/2006 | Wang | G06F 9/30145 |
| | | | | 716/104 |
| 7,353,244 | B2 * | 4/2008 | Aldrich | G06F 7/5443 |
| | | | | 708/319 |
| 9,292,297 | B2 * | 3/2016 | Gopal | G06F 9/30145 |
| 9,703,531 | B2 * | 7/2017 | Lutz | G06F 7/50 |
| 9,778,907 | B2 * | 10/2017 | Elmer | G06F 9/30185 |
| 2003/0097391 | A1 * | 5/2003 | Saulsbury | G06F 7/5443 |
| | | | | 708/490 |
| 2005/0210089 | A1 * | 9/2005 | Kershaw | G06F 7/49921 |
| | | | | 708/209 |
| 2015/0143086 | A1 | 5/2015 | Khan | |
| 2018/0113708 | A1 * | 4/2018 | Corbal | G06F 7/483 |
| 2018/0210733 | A1 | 7/2018 | Stephens et al. | |
| 2018/0267898 | A1 * | 9/2018 | Henry | G06N 3/0454 |
| 2019/0026250 | A1 * | 1/2019 | Das Sarma | G06F 9/3853 |
| 2019/0102174 | A1 | 4/2019 | Madduri et al. | |
| 2019/0102192 | A1 * | 4/2019 | Madduri | G06F 9/30036 |

\* cited by examiner ively used in VDSP instructions in a vector digital signal processing instruction set, the overflow problem in a multiply-accumulate operation becomes increasingly serious.

MULTIPLY-ACCUMULATE INSTRUCTION PROCESSING METHOD AND APPARATUS

CROSS-REFERENCE TO RELATED APPLICATIONS

This Application claims priority to Chinese Patent Application No. 201910292663.8 filed Apr. 12, 2019, which is incorporated herein in its entirety.

TECHNICAL FIELD

The present invention relates to the field of processors, and in particular, to a processor core and a processor for an instruction set having a multiply-accumulate instruction.

BACKGROUND

In digital signal processing, a multiply-accumulate operation is a common operation and is widely used in filter operations such as Fast Fourier Transform (FFT) and FIR/FFIR, convolution operations, and matrix operations. Continuous accumulation of a large number of multiplication results leads to a continuous increase in the value of an accumulation result. The value of the accumulation result may even exceed the maximum range represented by the number of bits for storing the accumulation result, resulting in an overflow.

With regard to the problem in which an overflow occurs in a multiply-accumulate result, existing solutions include the following:

1. Performing a saturation operation on the result, such that when an overflow occurs in the result, a value closest to an overflow value is used to represent the result without having to expand the bit width. The defect of this solution is as follows: the saturation operation can only store the result in a range closest to a range that the operation is capable of representing; and if an actual result far exceeds the range, or if an overflow occurs in a large number of operation results, then an overall result may be skewed, which cannot be used for subsequent operations.

2. Expanding the number of bits for representing a result, i.e., more bits are used to represent an exact operation result. The defect of this solution is as follows: in order to prevent data information loss caused by the overflow, a large number of bits are generally required to be additionally added so as to store an accumulation result, thereby increasing the overall operation bit width, and increasing resources for storage. In addition, the benefits gained at the expense of increasing the costs may be limited. This is because in subsequent operations, the result on which bit width expansion has been performed is generally required to undergo reduction, and only part of the information is retained to meet a bit width criterion of subsequent processing.

In addition, because SIMD instructions capable of performing the same operation in parallel on a plurality of groups of data are widely used in VDSP instructions in a vector digital signal processing instruction set, the overflow problem in a multiply-accumulate operation becomes increasingly serious.

Therefore, a novel solution to solve the overflow problem caused by the multiply-accumulate operation is desired.

SUMMARY

The present invention provides a novel instruction processing apparatus and instruction processing method, aiming to solve or at least mitigate at least one of the foregoing problems.

According to one aspect of the present invention, an instruction processing apparatus is provided, comprising a first register adapted to store first source data, a second register adapted to store second source data, a third register adapted to store accumulated data, a decoder adapted to receive and decode a multiply-accumulate instruction, and an execution unit. The multiply-accumulate instruction indicates that the first register serves as a first operand, the second register serves as a second operand, the third register serves as a third operand, and a shift flag. The execution unit is coupled to the first register, the second register, the third register, and the decoder, and configured to execute the decoded multiply-accumulate instruction so as to acquire the first source data from the first register and acquire the second source data from the second register, perform a multiplication operation on the first source data and the second source data so as to obtain a multiplication result, shift the multiplication result according to the shift flag, and add the shifted multiplication result and the accumulated data in the third register so as to obtain a multiply-accumulate result.

Optionally, in the instruction processing apparatus according to the present invention, the shift flag indicates a number of shifts; and the execution unit is adapted to shift the multiplication result from a high bit to a low bit, a number of the shifted bits being the number of shifts indicated by the shift flag.

Optionally, in the instruction processing apparatus according to the present invention, the most significant bit of the multiplication result is a sign bit, and the execution unit is suitable for, when shifting the multiplication result, adding a value of the sign bit to the most significant bit of the multiplication result each time a bit is shifted.

Optionally, in the instruction processing apparatus according to the present invention, the multiplication result is an unsigned number, and the execution unit is suitable for, when shifting the multiplication result, adding a value of 0 to the most significant bit of the multiplication result each time a bit is shifted.

Optionally, in the instruction processing apparatus according to the present invention, the execution unit is adapted to store the multiply-accumulate result to the third register so as to replace the accumulated data.

Optionally, the instruction processing apparatus according to the present invention further comprises a fourth register adapted to store the multiply-accumulate result; the multiply-accumulate instruction further indicates that the fourth register is a fourth operand; and the execution unit is adapted to store the multiply-accumulate result to the fourth register.

Optionally, in the instruction processing apparatus according to the present invention, the multiply-accumulate instruction further indicates a negation flag, and the execution unit is suitable for, before shifting the multiplication result, performing negation processing on the multiplication result according to a value of the negation flag.

Optionally, in the instruction processing apparatus according to the present invention, the multiply-accumulate instruction further indicates a selection flag, and the execution unit adding the shifted multiplication result and the accumulated data in the third register so as to obtain a multiply-accumulate result comprises: the execution unit directly uses the shifted multiplication result as the multiply-accumulate result according to a value of the selection flag.

Optionally, in the instruction processing apparatus according to the present invention, the first source data, the second source data, the accumulated data, and the multiply-accumulate result are vector data.

Optionally, in the instruction processing apparatus according to the present invention, the execution unit is further adapted to configure the multiply-accumulate result to be a saturated value when the multiply-accumulate result indicates that an overflow occurs.

Optionally, in the instruction processing apparatus according to the present invention, a length of the multiply-accumulate result and the accumulated data is the sum of a length of the first source data and a length of the second source data.

According to another aspect of the present invention, an instruction processing method is provided, comprising: receiving and decoding a multiply-accumulate instruction, the multiply-accumulate instruction indicating that a first register is a first operand, a second register is a second operand, a third register is a third operand, and a shift flag; and executing the decoded multiply-accumulate instruction so as to acquire first source data from the first register and acquire second source data from the second register, performing a multiplication operation on the first source data and the second source data so as to obtain a multiplication result, shifting the multiplication result according to the shift flag, and adding the shifted multiplication result and accumulated data in the third register so as to obtain a multiply-accumulate result.

According to another aspect of the present invention, a computing system is provided, comprising: a memory, and a processor coupled to the memory. The processor comprises a register set, a decoder, and an execution unit. The register set comprises a first register adapted to store first source data, a second register adapted to store second source data, and a third register adapted to store accumulated data. The decoder is adapted to receive and decode a multiply-accumulate instruction, the multiply-accumulate instruction indicating that the first register is a first operand, the second register is a second operand, the third register is a third operand, and a shift flag; and the execution unit is coupled to the first register, the second register, the third register, and the decoder, and configured to execute the decoded multiply-accumulate instruction so as to acquire the first source data from the first register and acquire the second source data from the second register, perform a multiplication operation on the first source data and the second source data so as to obtain a multiplication result, shift the multiplication result according to the shift flag, and add the shifted multiplication result and the accumulated data in the third register so as to obtain a multiply-accumulate result.

According to still another aspect of the present invention, a machine-readable storage medium is provided; the machine-readable storage medium comprises code which, when executed, enables a machine to execute the instruction processing method according to the present invention.

According to another aspect of the present invention, a system on chip is provided, comprising the instruction processing apparatus according to the present invention.

According to the solution of the present invention, the shift flag is introduced into the multiply-accumulate instruction, such that before an accumulation operation is performed on the multiplication result, the multiplication result is shifted to the right by a certain number of bits. Although the precision of the result is compromised to some degree, the solution significantly reduces the overflowing possibility. In this way, valid information in high bits of the result can be better stored without additional storage costs or a larger operation bit width. Therefore, a reliable solution for reducing the possibility of overflowing by moderately reducing the precision of a result is provided.

In addition, according to the solution of the present invention, the negation flag is introduced into the multiply-accumulate instruction, such that the multiply-accumulate instruction can be applied to both a multiply-accumulate operation and a multiply-subtract operation, thereby extending the application scope of the instruction.

BRIEF DESCRIPTION OF THE DRAWINGS

To achieve the foregoing and related objectives, certain illustrative aspects are described herein in conjunction with the following description and drawings. These aspects indicate various methods for practicing the principles disclosed herein, and all of the aspects and equivalents thereof are intended to fall within the scope of the claimed subject matter. The foregoing and other objectives, features, and advantages of the present disclosure will become more apparent by reading the following detailed description in conjunction with the drawings. Throughout the present disclosure, the same reference numerals generally refer to the same components or elements.

DETAILED DESCRIPTION

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be fully conveyed to those skilled in the art.

Figure 1:
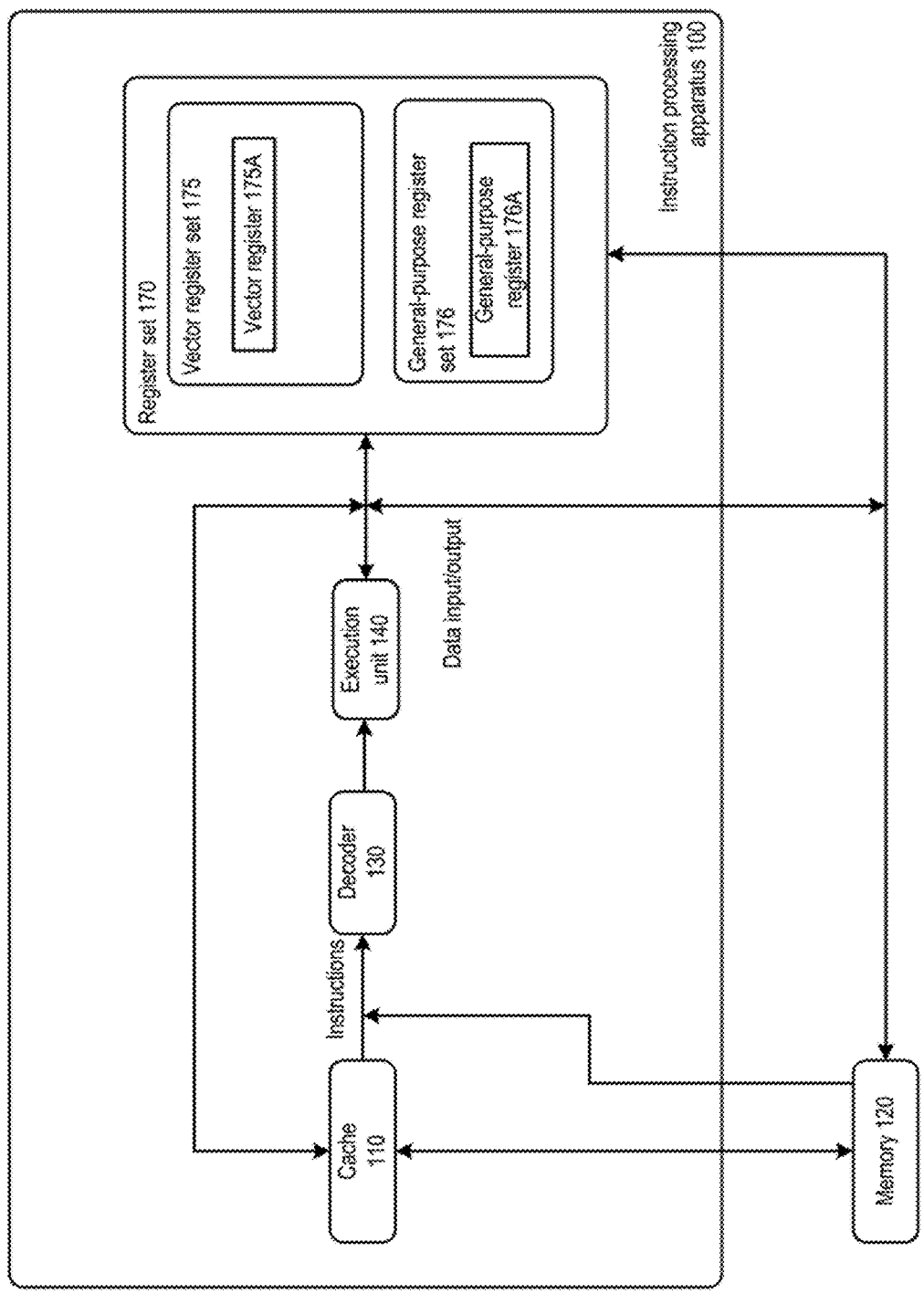
FIG. 1 shows a schematic diagram of an instruction processing apparatus according to an embodiment of the present invention.

FIG. 1 is a schematic diagram of an instruction processing apparatus 100 according to an embodiment of the present invention. The instruction processing apparatus 100 has an execution unit 140, and the execution unit includes a circuit operable for executing instructions (including a multiply-accumulate instruction according to the present invention). In some embodiments, the instruction processing apparatus 100 may be a processor, a processor core of a multi-core processor, or a processing element in an electronic system.

A decoder 130 receives incoming instructions in the form of high-level machine instructions or macroinstructions, and decodes these instructions to generate a low-level micro-operation, a microcode entry point, a microinstruction, or other low-level instructions or control signals. The low-level instruction or control signal may implement the operation of a high-level instruction by means of a low-level (for example, circuit-level or hardware-level) operation. Various mechanisms may be used to implement the decoder 130. Examples of suitable mechanisms include, but are not limited to, microcode, a lookup table, a hardware implementation, and a programmable logic array (PLA). The present invention is not limited to the various mechanisms for implementing the decoder 130, and any mechanism that can implement the decoder 130 falls within the protection scope of the present invention.

The decoder 130 may receive an incoming instruction from a cache 110 a memory 120, or other sources. The decoded instruction includes one or a plurality of micro-operations, microcode entry points, microinstructions, other instructions, or other control signals, all of which reflect the received instruction, or are derived from the received instruction. These decoded instructions are sent to the execution unit 140, and are executed thereby. When executing these instructions, the execution unit 140 receives data inputs from a register set 170, the cache 110, and/or the memory 120, and generates data outputs thereto.

In one embodiment, the register set 170 includes an architectural register, which is also referred to as a register. Unless otherwise specified or clearly and obviously known, the phrases of the architectural register, the register set, and the register herein are used to refer to registers visible (for example, software-visible) to software and/or a programmer and/or specified by a macroinstruction to identify an operand. These registers are different from other non-architectural registers (for example, a temporary register, a reorder buffer, or a retirement register) in a given microarchitecture.

In order not to obscure the description, a relatively simple instruction processing apparatus 100 is shown and described. It should be appreciated that other embodiments may have more than one execution unit. For example, the apparatus 100 may include a plurality of different types of execution units, such as an arithmetic unit, an arithmetic logic unit (ALU), an integer unit, or a floating-point unit. Other instruction processing apparatus or processor embodiments can have a plurality of cores, logic processors, or execution engines. A plurality of embodiments of the instruction processing apparatus 100 will be provided next with reference to FIGS. 6A-13.

According to an embodiment, the register set 170 includes a vector register set 175. The vector register set 175 includes a plurality of vector registers 175A. These vector registers 175A may store operands of a multiply-accumulate instruction. Each of the vector registers 175A may be 512-bit, 256-bit, or 128-bit, or can use different vector widths. The register set 170 may further include a general-purpose register set 176. The general-purpose register set 176 includes a plurality of general-purpose registers 176A. These general-purpose registers 176A may also store the operands of the multiply-accumulate instruction. The multiply-accumulate instruction may be used as a SIMD instruction so as to operate on a vector, and may also be used as a general instruction so as to operate on a single piece of data.

Figure 2:
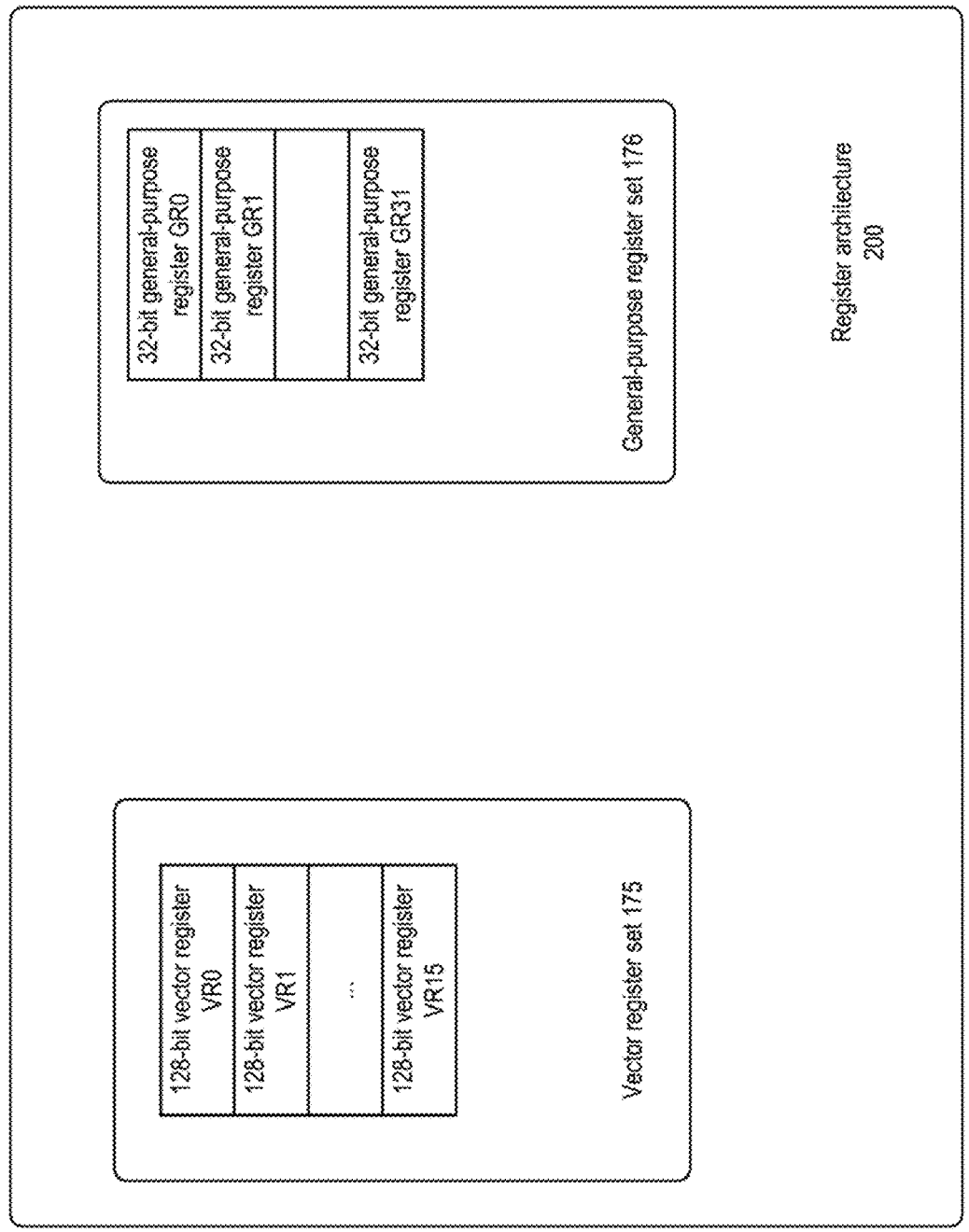
FIG. 2 shows a schematic diagram of a register architecture according to an embodiment of the present invention.

FIG. 2 shows a schematic diagram of a low-level register architecture 200 according to an embodiment of the present invention. The register architecture 200 is based on a C-Sky processor, which implements a vector signal processing instruction set. However, it should be understood that different register architectures supporting different register lengths, different register types, and/or different numbers of registers may also be used without departing from the protection scope of the present invention.

As shown in FIG. 2, 16 128-bit vector registers VR0[127:0]-VR15[127:0] and a series of data processing SIMD instructions for these 16 vector registers are defined in the register architecture 200. According to the definition of a specific instruction, each of the vector registers may be regarded as a plurality of 8-bit, 16-bit, 32-bit, or even 64-bit elements. In addition, 32 32-bit general-purpose registers GR0[31:0]-GR31[31:0] are further defined in the register architecture 200. The general-purpose registers GR0-GR31 may store some control status values during the processing of the SIMD instruction, and may also store an operand during the processing of a general instruction. According to an implementation manner, the vector register set 175 described with reference to FIG. 1 may use one or a plurality of the vector registers VR0-VR15 shown in FIG. 2; and the general-purpose register set 176 described with reference to FIG. 1 may likewise use one or a plurality of the general-purpose registers GR0-GR31 shown in FIG. 2.

In an alternative embodiment of the present invention, a relatively wider register or a relatively narrower register may be used. In addition, more, fewer, or different register sets and registers may be used in alternative embodiments of the present invention.

Figure 3:
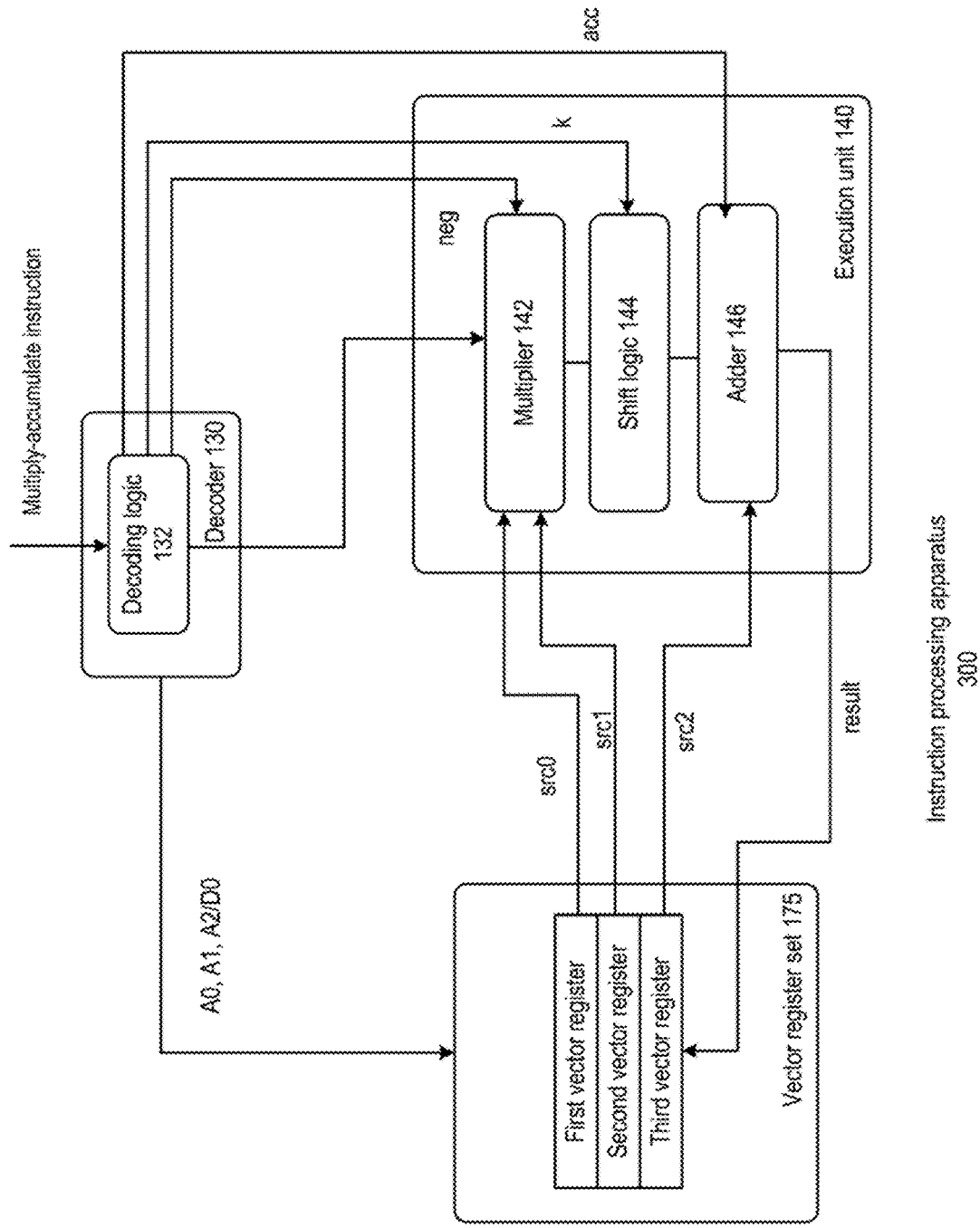
FIG. 3 shows a schematic diagram of an instruction processing apparatus according to an embodiment of the present invention.

FIG. 3 shows a schematic diagram of an instruction processing apparatus 300 according to an embodiment of the present invention. The instruction processing apparatus 300 shown in FIG. 3 is a further extension of the instruction processing apparatus 100 shown in FIG. 1; and some components are omitted for ease of description. Therefore, the same reference numerals as those in FIG. 1 are used to indicate the same and/or similar components.

The instruction processing apparatus 300 is adapted to execute a multiply-accumulate instruction. According to an embodiment of the present invention, the multiply-accumulate instruction includes a first operand specifying a first register A0, a second operand specifying a second register A1, a third operand specifying a third register A2, and a shift flag k. The shift flag k is an immediate operand, and specifies the number of bits to be shifted. The first register A0 and the second register A1 respectively store first source data src0 and second source data src1 to be used for a multiplication operation; and the third register A2 stores accumulated data src2 for an accumulation operation. In one implementation manner, the multiply-accumulate instruction stores a multiply-accumulate result "result" to the third register A2 so as to update the previously stored accumulated data src2; therefore, the multiply-accumulate instruction may not specify a destination for storing the multiply-accumulate result "result." In another embodiment, the multiply-accumulate instruction may further specify the destination for storing the multiply-accumulate result "result." The destination may also be a register D0.

According to an embodiment of the present invention, the multiply-accumulate instruction may be used as one type of SIMD instructions. In other words, the multiply-accumulate instruction could operate on vector data; and in this case, all of the first register, the second register, and the third register are vector registers. According to another embodiment, the multiply-accumulate instruction may be a conventional instruction, and operates on a single piece of data. The present invention is not limited to the type of operands, and all data that may undergo a multiply-accumulate operation falls within the protection scope of the present invention. Hereinafter, the vector register is used as an example to describe the multiply-accumulate instruction; nevertheless, various aspects in the subsequent description can also be applied to other types of data.

As shown in FIG. 3, the decoder 130 includes decoding logic 132. The decoding logic 132 decodes the multiply-accumulate instruction so as to determine a first vector register corresponding to the A0, a second vector register corresponding to the A1, and a third vector register corresponding to the A2 in the vector register set 175 and the value of the shift flag k serving as the immediate operand.

Optionally, according to an embodiment of the present invention, when the accumulation result "result" is stored in a fourth vector register different from the third vector register, the decoding logic 132 further determines the fourth vector register corresponding to the D0.

The execution unit 140 includes a multiplier 142, shift logic 144, and an adder 146. The multiplier 142 reads the first source data src0 stored in the first vector register A0 and the second source data src1 stored in the second vector register A1 in the vector register set 175, performs a multiplication operation on the first source data src0 and the second source data src1 so as to obtain a multiplication result, and sends the multiplication result to the shift logic 144.

Optionally, according to an embodiment of the present invention, the multiply-accumulate instruction further includes a negation flag neg. When decoding the multiply-accumulate instruction, the decoding logic 132 further determines the value of the negation flag neg, and sends the value of the neg to the multiplier 142. Before sending the multiplication result to the shift logic 144, the multiplier 142 may determine, according to the value of the neg, whether to perform a negation operation on the multiplication result. For example, when the value of the neg is 1, it indicates that negation is to be performed on the multiplication result; the multiplier 142 may first perform a negation operation on the multiplication result, and send the negated multiplication result to the shift logic 144. By introducing the negation flag neg, the embodiment may extend the multiply-accumulate instruction to a multiply-subtract operation.

The shift logic 144 performs a shift operation on the received multiplication result according to the value of the shift flag k, and sends the shifted multiplication result to the adder 146. The value of the shift flag k indicates the number of bits to be shifted when shifting the multiplication result. The shift operation may move a value on each bit of the multiplication result to a lower bit; that is, a value on a higher bit is moved to a lower bit, and a value on a lower bit is discarded. This shift operation may also be referred to as a right shift. Each time a bit is shifted, the value on each bit is moved to an adjacent lower bit; and the value on the least significant bit is discarded. Since the values on higher bits are more important, this shift method can retain important data, and discard relatively insignificant data. According to an embodiment of the present invention, the value of the shift flag k indicates the number of bits to be shifted; that is, the multiplication result is shifted to the right by k bits.

When the multiplication result is shifted to the right, the higher bits need to be filled with corresponding data. According to an embodiment of the present invention, when the first source data src0 and the second source data src1 are signed numbers, the multiplication result is a signed number; and in this case, a signed right shift is employed. Specifically, the most significant bit of the multiplication result is a sign bit; and when the shift operation is performed on the multiplication result, values to be filled for the most significant bits during the shifting are all configured to be sign bits. For example, if shifting to the right by 3 bits is performed, all of the 3 most significant bits are configured to be sign bits.

According to another embodiment, when the first source data src0 and the second source data src1 are unsigned numbers, the multiplication result is an unsigned number; and an unsigned right shift operation is employed. Specifically, when the shift operation is performed on the multiplication result, values to be filled for the most significant bits during the shifting are all configured to be 0. For example, if shifting to the right by 3 bits is performed, all of the 3 most significant bits are configured to be 0.

The adder 146 receives the shifted multiplication result from the shift logic 144, reads the accumulated data src2 stored in the third vector register A2 in the vector register sot 175, and performs an addition operation on the two so as to obtain the multiply-accumulate result "result."

Optionally, according to an embodiment of the present invention, the multiply-accumulate instruction further includes a selection flag acc. When decoding the multiply-accumulate instruction, the decoding logic 132 further determines the value of the selection flag acc, and sends the value of the acc to the adder 146. The adder 146 determines, according to the value of the selection flag acc, how to perform the addition operation. For example, if the selection flag acc exists, or if the value of the selection flag acc is 1, then the adder 146 does not use the accumulated data src2, but instead directly configures the multiplication result to be the multiply-accumulate result "result." In contrast, if the selection flag acc does not exist, or if the value of the selection flag acc is 0, the adder 146 adds the multiplication result and the accumulated data src2, and configures the addition result to be the multiply-accumulate result "result."

Optionally, according to another embodiment of the present invention, when the adder 146 performs an addition operation on the multiplication result and the src2, an overflow may occur in the multiply-accumulate result "result"; in this case, the adder 146 may monitor whether the result of the addition operation exceeds a representable range of a target element; and if the result exceeds the representable range, then the adder 146 can saturate the multiply-accumulate result "result" to be a value in the representable range closest to the actual result; that is, the adder 146 can configure the multiply-accumulate result "result" to be a saturated value. For example, if the addition is performed on two signed 8-bit numbers each having the value of 127, and since the result 127+127=254 exceeds the maximum representable value (127) of the target element, the result is configured to be a saturated value 127.

After the adder 146 calculates and obtains the multiply-accumulate result "result," if the multiply-accumulate instruction does not specify a special destination, then the destination D0 and the third register A2 are configured to be the same register; therefore, the "result" can be written to the third register A2 to replace the accumulated number src2. In this way, the multiply-accumulate instruction is repeatedly called without changing the third register A2, and the results of a plurality of multiply-accumulations are thus eventually stored in the third register A2. According to another embodiment, if a special destination is specified in the multiply-accumulate instruction, namely, the destination register D0, then the multiply-accumulate result "result" can be written into the destination register D0.

The present invention is not limited to the length of data stored in each register. For example, assuming that the src0 is N-bit data and is represented by src0[N-1:0], and the src1 is M-bit data and is represented by src1[M-1:0], then the multiplication result of the src0 and the src1 is (M+N)-bit. If the value of the shift flag k satisfies 0<K<(M+N), then the shifted multiplication result is still (M+N)-bit. If the src2 is G-bit data, then the src2 is represented by src2[G-1:0]. If M+N=G, then all of the (M+N) bits in the shifted multiplication result may be selected for an addition operation with the G bits of the src2. If M+N>G, then a G-bit result acquired by truncating the (M+N) bits of the shifted multiplication result may also be subjected to an addition operation with the G bits of the src2.

According to the instruction processing apparatus 300 shown in FIG. 3, the shift flag k is introduced into the multiply-accumulate instruction, and the right shift operation is performed on the multiplication result before the addition operation is performed, thereby significantly reducing the overflowing risk for the multiply-accumulate result.

Figure 4:
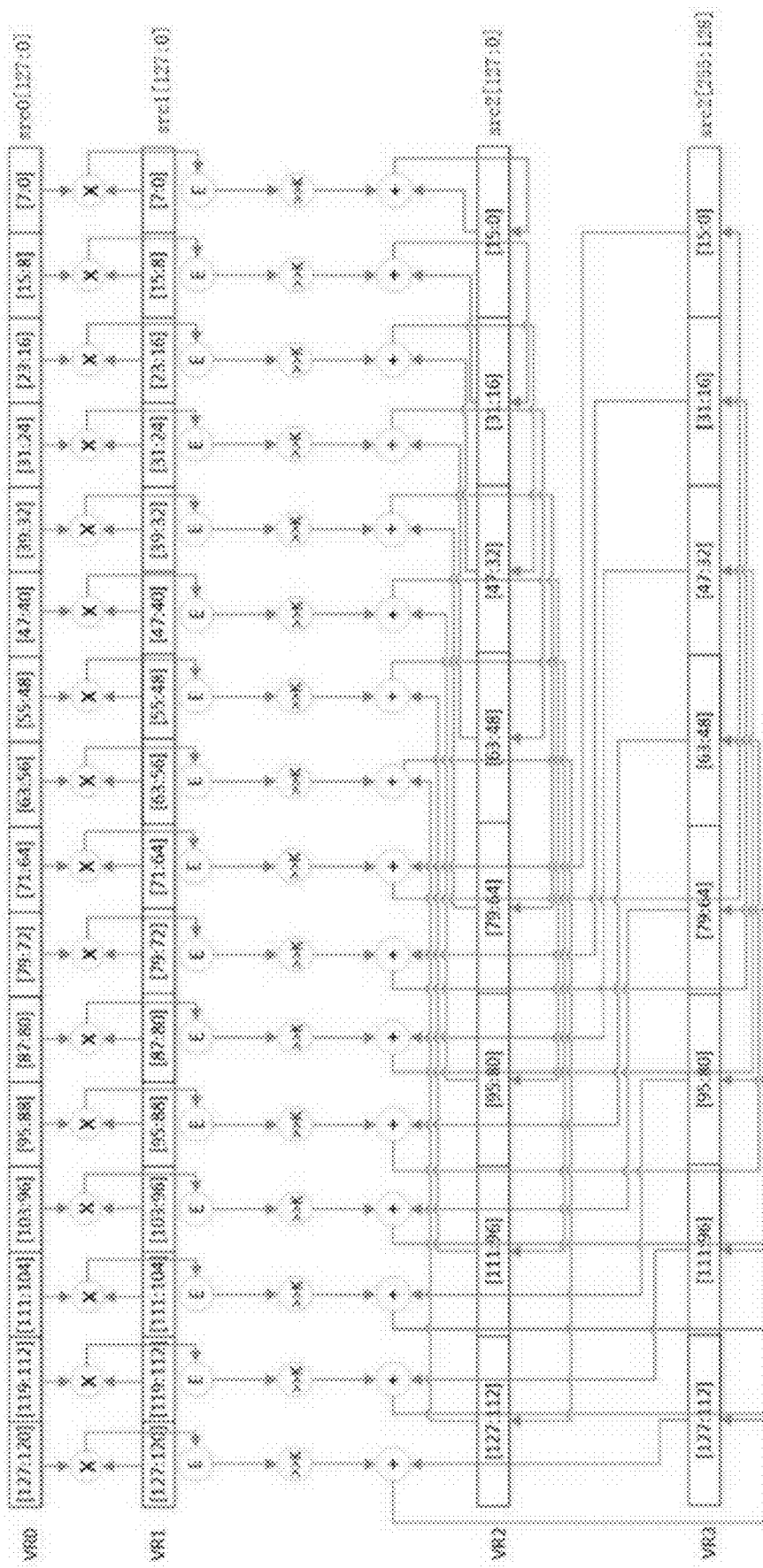
FIG. 4 shows a schematic diagram of an instruction processing procedure according to an embodiment of the present invention.

FIG. 4 shows a schematic diagram of an instruction processing procedure 400 according to another embodiment of the present invention. The instruction processing procedure shown in FIG. 4 describes the instruction processing procedure of the instruction processing apparatus 300 shown in FIG. 3. FIG. 4 shows four vector registers VR0, VR1, VR2, and VR3. Each of the vector registers stores 128-bit vector data. During the execution of the instruction processing apparatus 300, the first source data src0 is stored in the VR0, and the second source data src1 is stored in the VR1; the accumulated data src2 is stored in the vector registers VR2 and VR3; therefore, the accumulated data is 256-bit; in addition, the multiply-accumulate result generated by means of instruction processing is also stored in the VR2 and the VR3 so as to overwrite the accumulated data src2.

As shown in FIG. 4, the multiply-accumulate operation is performed byte by byte on the VR0 and the VR1. Vector data in the VR0 is divided into 16 bytes, namely, from VR0[7:0], VR0[15:8], and so on, to VR0[127:120]. Similarly, vector data in the VR1 is divided into 16 bytes, namely, from VR1[7:0], VR1[15:8], and so on, to VR1[127:120]. A multiplication operation X is performed on each corresponding byte element acquired by means of division in the VR0 and each corresponding byte element acquired by means of division in the VR1 so as to acquire a multiplication result E; for example, the VR0[7:0] and the VR1[7:0] are multiplied to acquire a multiplication result E[15:0], and so on.

As described above, the src2 is 256-bit vector data, and therefore the src2 can be correspondingly divided into 16 elements, each of the elements being 2-byte long; that is, the first 8 elements occupy the vector register VR2, and are respectively VR2[15:0], VR2[31:16], and so on, and VR2[127:112]; and the last 8 elements occupy the vector register VR3, and are respectively VR3[15:0], VR3[31:16], and so on, and VR3[127:112].

The multiplication result E is shifted by K bits, and is added to the accumulated data src2 from the VR2 and the VR3 so as to obtain a final multiply-accumulate result, which is also stored in the VR2 and the VR3. For example, after the E[15:0] is shifted by K bits, the shifted E[15:0] is added to the VR2[15:0], and the final multiply-accumulate result is also stored in the VR2[15:0]; similarly, after the E[255:240] is shifted by K bits, the shifted E[255:240] is added to the VR3[127:112], and the final multiply accumulate result is also stored in the VR3[127:112].

Figure 5:
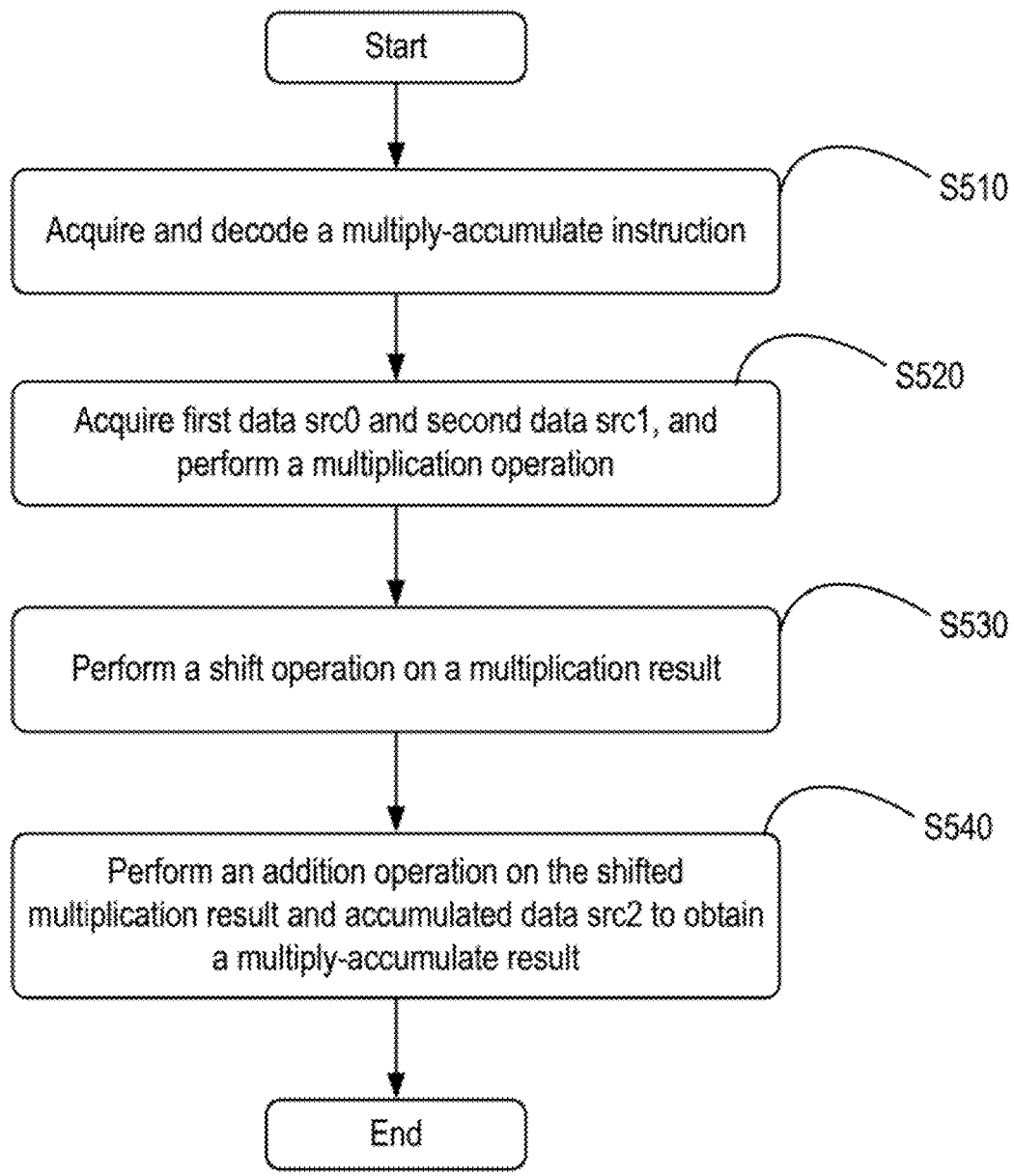
FIG. 5 shows a schematic diagram of an instruction processing method according to an embodiment of the present invention.

FIG. 5 is a schematic diagram of an instruction processing method 500 according to yet another embodiment of the present invention. The instruction processing method described in FIG. 5 can be executed in the instruction processing apparatus, the processor core, the processor computer system, and the system on chip described in FIG. 1, FIG. 3, FIG. 4, and FIGS. 6A-9 and is adapted to execute the multiply-accumulate instruction described above.

As shown in FIG. 5, the method 500 starts at step S510. In step S510, a multiply-accumulate instruction is received and decoded. As described above with reference to FIG. 3, the multiply-accumulate instruction includes a first operand specifying a first register A0, a second operand specifying second register A1, a third operand specifying a third register A2, and a shift flag k. The shift flag k is an immediate operand, and specifies the number of bits to be shifted. The first register A0 and the second register A1 respectively store first source data src0 and second source data src1 to be used for a multiplication operation; and the third register A2 stores accumulated data src2 for an accumulation operation. In one implementation manner, the multiply-accumulate instruction stores a multiply-accumulate result "result" to the third register A2 so as to update the previously stored accumulated data src2; therefore, the multiply-accumulate instruction may not specify a destination for storing the multiply-accumulate result "result." In another embodiment, the multiply-accumulate instruction may further specify the destination for storing the multiply-accumulate result "result." The destination can also be a register D0. In step S510, the multiply-accumulate instruction is decoded so as to determine a first vector register corresponding to the A0, a second vector register corresponding to the A1, and a third vector register corresponding to the A2 in the vector register set 175 and the value of the shift flag k serving as the immediate operand. Optionally, according to an embodiment of the present invention, when the accumulation result "result" is stored in a fourth vector register different from the third vector register, in step S510, the fourth vector register corresponding to the D0 is further determined.

Then, in step S520, the first source data src0 stored in the first vector register A0 and the second source data src1 stored in the second vector register A1 in the vector register set 175 are read; and a multiplication operation is performed on the first source data src0 and the second source data src1 so as to obtain a multiplication result.

Optionally, according to an embodiment of the present invention, the multiply-accumulate instruction further includes a negation flag neg. In step S510, when the multiply-accumulate instruction is decoded, the value of the negation flag neg is further determined. In step S520, after the multiplication result is obtained, whether to perform a negation operation on the multiplication result can be determined according to the value of the neg. For example, when the value of the neg is 1, it indicates that negation is to be performed on the multiplication result; then in step S520, a negation operation can be performed on the multiplication result, and the negated multiplication result is used as an output result of step S520. By introducing the negation flag neg, the embodiment may extend the multiply-accumulate instruction to a multiply-subtract operation.

Then in step S530, according to the value of the shift flag k, a shift operation is performed on the multiplication result generated in step S520. The value of the shift flag k indicates the number of bits to be shifted when shifting the multiplication result. As described above with reference to FIG. 3, this shift operation is also referred to as the right shift. Each time a bit is shifted, the value on each bit is moved to an adjacent lower bit; and the value on the least significant bit is discarded. Since the values on higher bits are more important, this shift method can retain important data, and discard relatively insignificant data. According to an embodiment of the present invention, the value of the shift flag k indicates the number of bits to be shifted; that is, the multiplication result is shifted to the right by k bits.

When the multiplication result is shifted to the right, the higher bits need to be filled with corresponding data. According to an embodiment of the present invention, when the first source data src0 and the second source data src1 are signed numbers, the multiplication result is a signed number; and in this case, a signed right shift is employed. Specifically, the most significant bit of the multiplication result is a sign bit, values to be filled for the most significant bits during the shifting are all configured to be sign bits.

According to another embodiment, when the first source data src0 and the second source data src1 are unsigned numbers, the multiplication result is an unsigned number; and an unsigned right shift operation is employed. When the shift operation is performed on the multiplication result, values to be filled for the most significant bits during the shifting are all configured to be 0.

Then in step S540, the shifted multiplication result outputted in step S530 is received; the accumulated data src2 stored in the third vector register A2 in the vector register set 175 is read; and an addition operation is performed on the two so as to obtain the multiply-accumulate result "result."

Optionally, according to an embodiment of the present invention, the multiply-accumulate instruction further includes a selection flag acc. In step S510, when the multiply-accumulate instruction is decoded, the value of the selection flag acc is further determined. In step S540, how to perform the addition operation is determined according to the value of the selection flag acc. For example, if the selection flag acc exists, or if the value of the selection flag acc is 1, then the accumulated data src2 is not used; and the multiplication result is directly configured to be the multiply-accumulate result "result." In contrast, if the selection flag acc does not exist, or if the value of the selection flag acc is 0, the multiplication result is added to the accumulated data src2; and an addition result is configured to be the multiply-accumulate result "result."

Optionally, according to another embodiment of the present invention, in step S540, when an addition operation is performed on the multiplication result and the src2, an overflow may occur in the multiply-accumulate result "result"; in this case, whether the result of the addition operation exceeds a representable range of a target element may be monitored; and if the result exceeds the representable range, then in step S540, the multiply-accumulate result "result" may be saturated to be a value in the representable range closest to the actual result; that is, the multiply-accumulate result "result" may be configured to be a saturated value.

After the multiply-accumulate result "result" is calculated and obtained in step S540, if the multiply-accumulate instruction does not specify a special destination, then the destination D0 and the third register A2 are configured to be the same register; therefore, the "result" may be written to the third register A2 to replace the accumulated number src2. In this way, the multiply-accumulate instruction is repeatedly called without changing the third register A2, and the results of a plurality of multiply-accumulations are thus eventually stored in the third register A2. According to another embodiment, if a special destination is specified in the multiply-accumulate instruction, namely, the destination register then the multiply-accumulate result "result" may be written into the destination register D0.

As described above, the instruction processing apparatus according to the present invention may be implemented as a processor core, and the instruction processing method may be executed in the processor core. Different methods may be used to implement the processor core in different processors. For example, the processor core may be implemented as a general-purpose in-order core for general-purpose computing, a high-performance general-purpose out-of-order core for general-purpose computing, and a special-purpose core for graphics and/or scientific (throughput) computing. The processor may be implemented as a central processing unit (CPU) and/or coprocessor, where the CPU may include one or a plurality of general-purpose in-order cores and/or one or a plurality of general-purpose out-of-order cores, and the coprocessor may include one or a plurality of special-purpose cores. Combinations of such different processors can result in different computer system architectures. In a computer system architecture, the coprocessor may be on a chip separated from the CPU. In another computer system architecture, the coprocessor may be on a separate die in the same package as the CPU. In another computer system architecture, the coprocessor and the CPU may be on the same die (in this case, such a coprocessor is sometimes referred to as special-purpose logic such as integrated graphics and/or scientific (throughput) logic, or as a special-purpose core). In another computer system architecture referred to as a system on chip, the described CPU (sometimes referred to as an application core or an application processor), the coprocessor described above, and additional functions may be included on the same die. An exemplary core architecture, processor, and computer architecture will be described next with reference to FIGS. 6A-9.

Figure 6A:
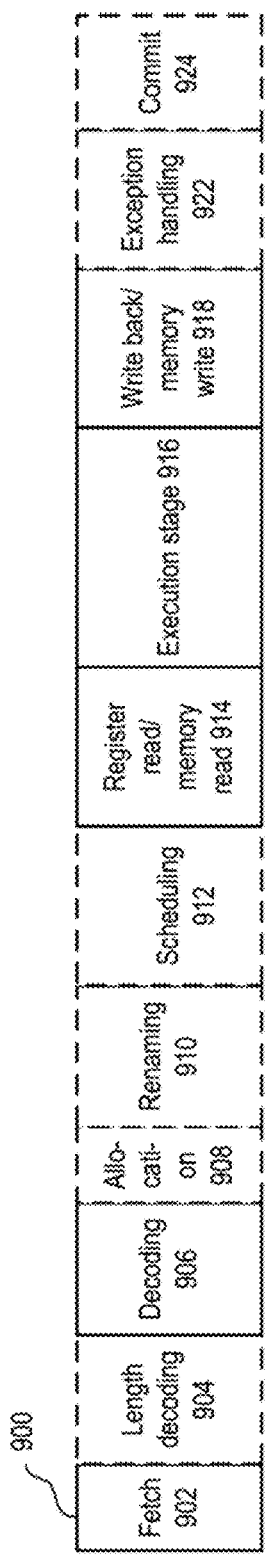
FIG. 6A shows a schematic diagram of an instruction processing pipeline according to an embodiment of the present invention.
Figure 6B:
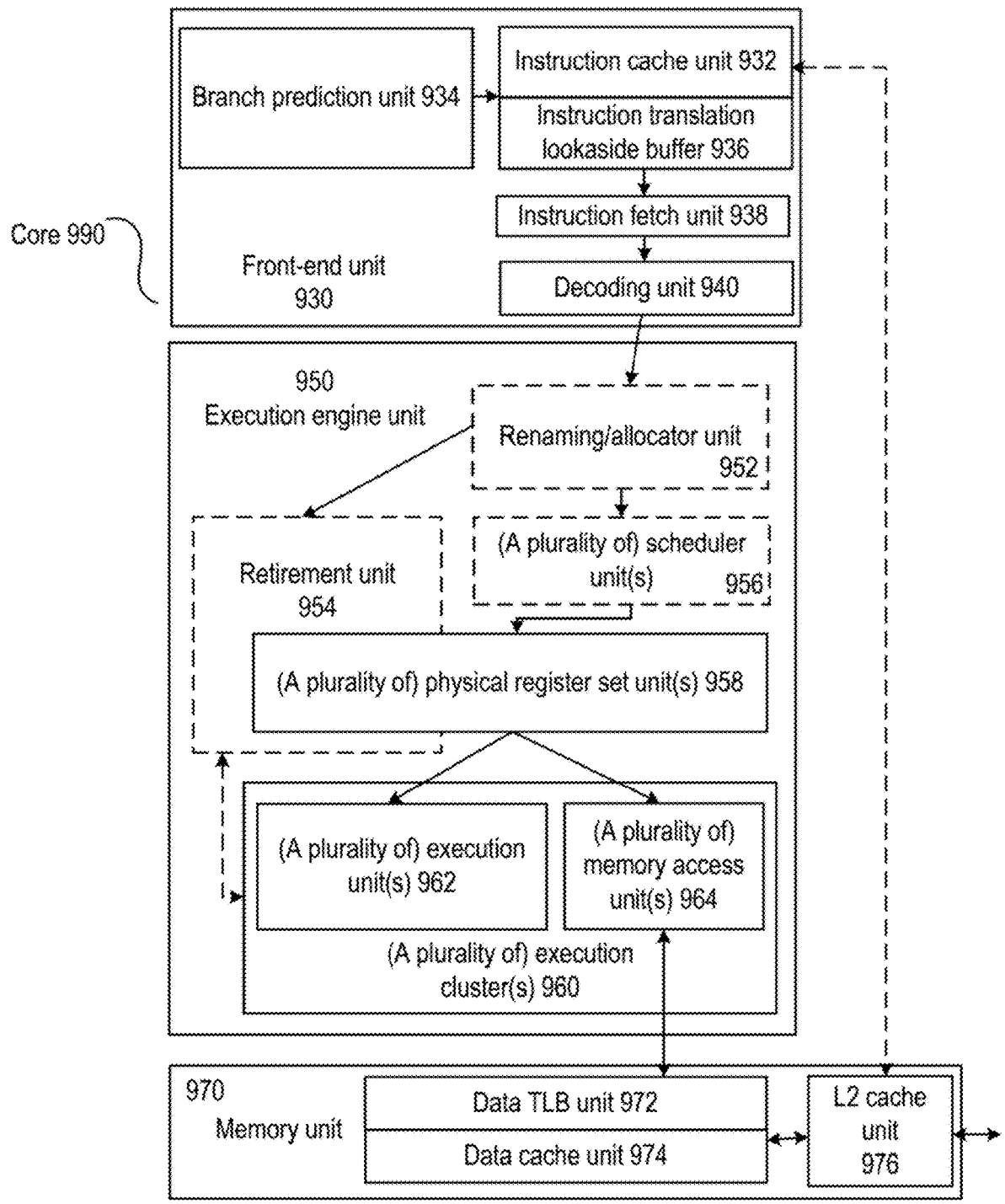
FIG. 6B shows a schematic diagram of a processor core architecture according to an embodiment of the present invention.

FIG. 6A is a schematic diagram showing an instruction processing pipeline according to an embodiment of the present invention, where the pipeline includes an in-order pipeline and an out-of-order issue/execution pipeline. FIG. 6B is a schematic diagram showing a processor core architecture according to an embodiment of the present invention, where the processor core architecture includes an in-order architecture core and an out-of-order issue/execution architecture core related to register renaming. In FIGS. 6A and 6B, the in-order pipeline and the in-order core are shown by the solid lined boxes; and the out-of-order issue/execution pipeline and core are shown in the optional additional items in the dashed lined boxes.

As shown in FIG. 6A, the processor pipeline 900 includes a fetch stage 902, a length decoding stage 904, a decoding stage 906, an allocation stage 908, a renaming stage 910, a scheduling (also referred to as dispatching or issuing) stage 912, a register read/memory read stage 914, an execution stage 916, a write back/memory write stage 918, an exception handling stage 922, and a commit stage 924.

As shown in FIG. 6B, the processor core 990 includes an execution engine unit 950 and a front-end unit 930 coupled to the execution engine unit 950. Both the execution engine unit 950 and the front-end unit 930 are coupled to a memory unit 970. A core 990 may be a reduced instruction set computing (RISC) core, a complex instruction set computing (CSC) core, a very long instruction word (VLIW) core, or a hybrid or alternative core type. As yet another option, the core 990 may be a special-purpose core, such as a network or communication core, a compression engine, a coprocessor core, a general-purpose computing on graphics processor unit (GPGPU) core, or a graphics core (GPU).

The front-end unit 930 includes a branch prediction unit 934, an instruction cache unit 932 coupled to the branch prediction unit 934, an instruction translation lookaside buffer (TLB) 936 coupled to the instruction cache unit 932, an instruction fetch unit 938 coupled to the instruction translation lookaside buffer 936, and a decoding unit 940 coupled to the instruction fetch unit 938. A decoding unit (or decoder) 940 may decode instructions, generate one or a plurality of micro-operations, microcode entry points, microinstructions, other instructions, or other control signals decoded from, or otherwise reflect or are derived from the original instruction and use the same as an output. The decoding unit 940 may be implemented by using various mechanisms, including but not limited to, a look-up table, a hardware implementation, a programmable logic array (PLA), and a microcode read-only memory (ROM). In an embodiment, the core 990 includes a microcode ROM or other media storing microcode for certain macroinstructions (for example, in the decoding unit 940 or otherwise within the front-end unit 930). The decoding unit 940 is coupled to a renaming/allocator unit 952 in the execution engine unit 950.

The execution engine unit 950 includes the renaming/allocator unit 952. The renaming/allocator unit 952 is coupled to a retirement unit 954 and one or a plurality of scheduler units 956. The scheduler unit 956 represents any number of different schedulers, including a reservation station, a central instruction window, and the like. The scheduler unit 956 is coupled to each physical register set unit 958. Each physical register set unit 958 represents one or a plurality of physical register sets. Different physical register sets store one or a plurality of different data types, such as a scalar integer, a scalar floating point, a packed integer, a packed floating point, a vector integer, a vector floating point, and a status (for example, an instruction pointer serving an address of a next instruction that is to be executed). In an embodiment, the physical register set unit 958 includes a vector register unit, a write mask register unit, and a scalar register unit. These register units may be provided as an architectural vector register, a vector mask register, and a general-purpose register. The physical register set unit 958 is overwritten by the retirement unit 954, so that various methods for achieving register renaming and out-of-order execution are shown (for example, a reordering buffer and a retirement register set are used; a future file, a history buffer, and a retirement register set are used; or a register map and a register pool are used). The retirement unit 954 and the physical register set unit 958 are coupled to an execution cluster 960. The execution cluster 960 includes one or a plurality of execution units 962 and one or a plurality of memory access units 964. The execution unit 962 may perform various operations (for example, shift, addition, subtraction, and multiplication), and may perform operations on various types of data (for example, a scalar floating point, a packed integer, a packed floating point, a vector integer, and a vector floating point). Although some embodiments may include a plurality of execution units dedicated to a specific function or a function set, other embodiments may include only one execution unit performing all of the functions or a plurality of execution units performing all of the functions. In some embodiments, because separate pipelines are created for certain types of data/operations (for example, a scalar integer pipeline, a scalar floating point/packed integer/packed floating point/ vector integer/vector floating point pipeline, and/or memory access pipelines each having a scheduler unit and a physical register set unit and/or an execution cluster thereof), a plurality of scheduler units 956, physical register set units 958, and execution clusters 960 may be provided. It should also be appreciated that when separate pipelines are used, one or a plurality of pipelines among these pipelines may be out-of-order issue/execution pipelines, and the other pipelines may be in-order issue/execution pipelines.

The memory access unit 964 is coupled to the memory unit 970, and the memory unit 970 includes a data TLB unit 972, a data cache unit 974 coupled to the data TLB unit 972, and a level 2 (L2) cache unit 976 coupled to the data cache unit 974. In an exemplary embodiment, the memory access unit 964 may include a loading unit, a storage address unit, and a storage data unit, each of which is coupled to the data TLB unit 972 in the memory unit 970. The instruction cache unit 934 may further be coupled to the level 2 (L2) cache unit 976 in the memory unit 970. The L2 cache unit 976 is coupled to one or a plurality of other levels of caches, and is eventually coupled to a main memory.

As an example, the core architecture described above with reference to FIG. 6B can implement the pipeline 900 described above with reference to FIG. 6A through the following methods: (1) the instruction fetch unit 938 executes the fetch stage 902 and the length decoding stage 904; (2) the decoding unit 940 executes the decoding stage 906; (3) the renaming/allocator unit 952 executes the allocation stage 908 and the renaming stage 910; (4) the scheduler unit 956 executes the scheduling stage 912; (5) the physical register set unit 958 and the memory unit 970 execute the register read/memory read stage 914, and the execution cluster 960 executes the execution stage 916; (6) the memory unit 970 and the physical register set unit 958 execute the write back/memory write stage 918; (7) each unit may involves the exception handling stage 922; and (8) the retirement unit 954 and the physical register set unit 958 execute the commit stage 924.

The core 990 may support one or a plurality of instruction sets (for example, an x86 instruction set (having some extensions added together with a relatively new version); an MIPS instruction set of MIPS Technologies, Inc.; and an ARM instruction set of ARM Holdings (having optional additional extensions such as NEON), including the various instructions described herein. It should be understood that the core may support multithreading (executing two or more parallel sets of operations or threads), and various methods may be used to complete the multithreading. The various methods include time-division multithreading, simultaneous multithreading (where a single physical core provides a logical core for each of the threads being simultaneously multithreaded by the physical core), or a combination thereof (for example, time-division fetching and decoding and simultaneous multithreading thereafter using, for example, a hyper-threading technique).

Figure 7:
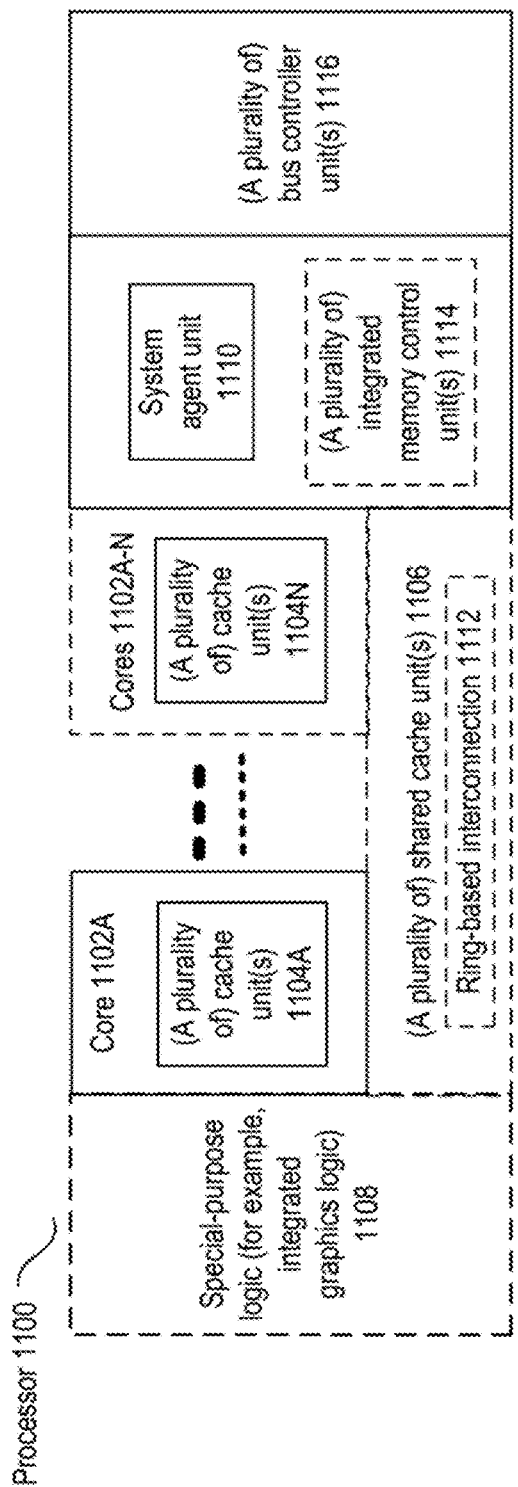
FIG. 7 shows a schematic diagram of a processor according to an embodiment of the present invention.

FIG. 7 shows a schematic diagram of a processor 1100 according to an embodiment of the present invention. As shown in the solid lined boxes in FIG. 7, according to an embodiment, the processor 1100 includes a single core 1102A, a system agent unit 1110, and a bus controller unit 1116. As shown in the dashed lined boxes in FIG. 7, according to another embodiment of the present invention, the processor 1100 may further include a plurality of cores 1102A-N, an integrated memory controller unit 1114 in the system agent unit 1110, and special-purpose logic 1108.

According to an embodiment, the processor 1100 may be implemented as a central processing unit (CPU), where the special-purpose logic 1108 is integrated graphics and/or scientific (throughput) logic (the logic can include one or a plurality of cores); and the cores 1102A-N may be one or a plurality of general-purpose cores (for example, a general-purpose in-order core, a general-purpose out-of-order core, or a combination of the two). According to another embodiment, the processor 1100 may be implemented as a coprocessor, where the cores 1102A-N are a plurality of special-purpose cores for graphics and/or science (throughput). According to another embodiment, the processor 1100 may be implemented as a coprocessor, where the cores 1102A-N are a plurality of general-purpose in-order cores. Therefore, the processor 1100 may be a general-purpose processor, a coprocessor, or a special-purpose processor, such as a network or communication processor, a compression engine, a graphics processor, a general-purpose graphics processing unit (GPGPU), a high-throughput many integrated core (MIC) coprocessor (including 30 or more cores), or an embedded processor. The processor 1100 may be implemented on one or a plurality of chips. The processor 1100 may be a part of one or a plurality of substrates, and/or any one of a plurality of processing techniques such as BiCMOS, CMOS, or NMOS may be used to implement the processor 1100 on one or a plurality of substrates.

A memory hierarchy includes one or a plurality of levels of cache within each core, one or a plurality of shared cache units 1106, and an external memory (not shown) coupled to the integrated memory controller unit 1114. The shared cache unit 1106 can include one or a plurality of intermediate level caches, such as a level 2 (L2), level 3 (L3), level 4 (L4), or other levels of cache, a last level cache (LLC), and/or a combination thereof. Although in one embodiment, a ring-based interconnection unit 1112 interconnects the integrated graphics logic 1108, the shared cache unit 1106, and the system agent unit 1110/integrated memory controller unit 1114, the present invention is not limited thereby; and these units may be interconnected by means of any number of well-known techniques.

The system agent 1110 includes those components coordinating and operating the cores 1102A-N. The system agent unit 1110 may include, for example, a power control unit (PCU) and a display unit. The PCU may include logic and a component required for adjusting a power status of the cores 1102A-N and the integrated graphics logic 1108. The display unit is used to drive one or a plurality of externally connected displays.

The cores 1102A-N may have the core architecture described above with reference to FIGS. 6A and 6B, and may be homogenous or heterogeneous in terms of architecture instruction set. That is, two or more of these cores 1102A-N may be capable of executing the same instruction set; and other cores may be capable of executing only a subset of the instruction set or a different instruction set.

Figure 8:
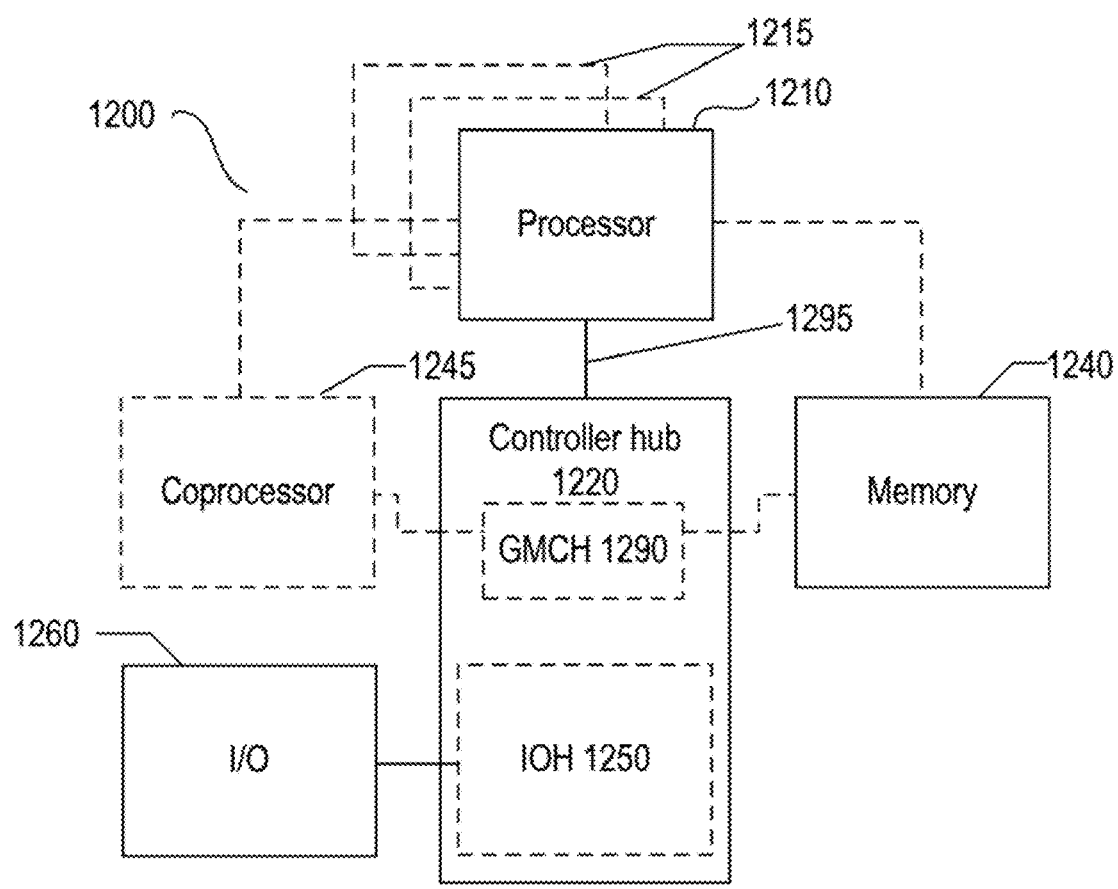
FIG. 8 shows a schematic diagram of a computer system according to an embodiment of the present invention.

FIG. 8 shows a schematic diagram of a computer system 1200 according to an embodiment of the present invention. The computer system 1200 shown in FIG. 8 may be applied to a laptop device, a desktop, a hand-held PC, a personal digital assistant, an engineering workstation, a server, a network device, a network hub, a switch, an embedded processor, a digital signal processor (DSP), a graphics device, a video game device, a set-top box, a microcontroller, a cell phone, a portable media player, a hand-held device, and various other electronic devices. The present invention is not limited to this; and all systems that may be included in the processor disclosed in the description and/or in other execution logic fall within the protection scope of the present invention.

As shown in FIG. 8, the system 1200 may include one or a plurality of processors 1210 and 1215. These processors are coupled to a controller hub 1220. In one embodiment, the controller hub 1220 includes a graphics memory controller hub (GMCH) 1290 and an input output hub (IOH) 1250 (which can be on separate chips). The GMCH 1290 includes a memory controller and a graphics controller coupled to a memory 1240 and a coprocessor 1245. The IOH 1250 couples an input/output (I/O) device 1260 to the GMCH 1290. As an alternative, the memory controller and the graphics controller are integrated in the processor, so that the memory 1240 and the coprocessor 1245 are directly coupled to the processor 1210; and the controller hub 1220 includes only the IOH 1250.

Optional features of the additional processor 1215 are shown in FIG. 8 by dashed lines. Each of the processors 1210 and 1215 may include one or a plurality of processing cores described herein, which may be a certain version of the processor 1100.

The memory 1240 may be, for example, a dynamic random access memory (DRAM), a phase change memory (PCM), or a combination of the two. In at least one embodiment, the controller hub 1220 communicates with the processors 1210 and 1215 via a multi-drop bus such as a front side bus (FSB), a point-to-point interface such as a QuickPath Interconnect (QPI), or a similar connection 1295.

In one embodiment, the coprocessor 1245 is a special-purpose processor, such as a high-throughput MIC processor, a network or communication processor, a compression engine, a graphics processor, a GPGPU, or an embedded processor. In one embodiment, the controller hub 1220 may include an integrated graphics accelerator.

In one embodiment, the processor 1210 executes an instruction for controlling a general-type of operation for data processing. Instructions embedded in these instructions may be coprocessor instructions. The processor 1210 identifies these coprocessor instructions as a type that should be executed by the attached coprocessor 1245. Therefore, the processor 1210 issues, on a coprocessor bus or other interconnections, these coprocessor instructions (or control signals representing coprocessor instructions) to the coprocessor 1245. The coprocessor 1245 receives and executes the received coprocessor instructions.

Figure 9:
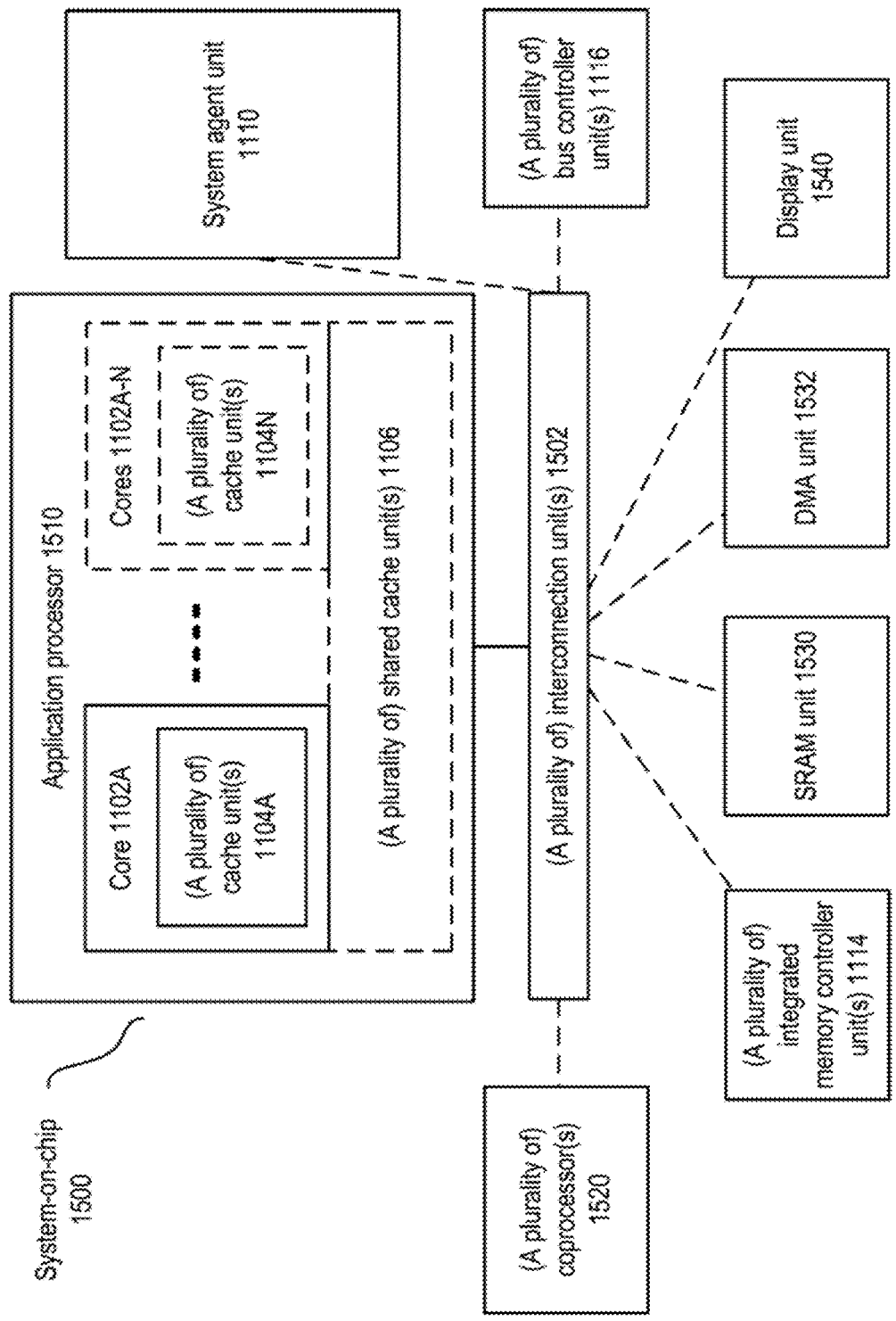
FIG. 9 shows a schematic diagram of a System on Chip (SoC) according to an embodiment of the present invention.

FIG. 9 shows a schematic diagram of a System on Chip (SoC) 1500 according to an embodiment of the present invention. The system on chip shown in FIG. 9 includes the processor 1100 shown in FIG. 7; and therefore components similar to those in FIG. 7 have the same reference numerals. As shown in FIG. 9, an interconnection unit 1502 is coupled to an application processor 1510, a system agent unit 1110, a bus controller unit 1116, an integrated memory controller unit 1114, one or a plurality of coprocessors 1520, a static random access memory (SRAM) unit 1530, a direct memory access (DMA) unit 1532, and a display unit 1540 for being coupled to one or a plurality of external displays. The application processor 1510 includes a set of one or a plurality of cores 1102A-N and a shared cache unit 110. The coprocessor 1520 includes integrated graphics logic, an image processor, an audio processor, and a video processor. In one embodiment, the coprocessor 1520 includes a special-purpose processor, such as a network or communication processor, a compression engine, a GPGPU, a high-throughput MIC processor, or an embedded processor.

Embodiments of the mechanisms disclosed herein may be implemented in hardware, software, firmware, or a combination of these implementations. Embodiments of the present invention may be implemented as a computer program or program code executed on a programmable system, and the programmable system includes at least one processor, a storage system (including a volatile memory, a non-volatile memory, and/or a storage element), at least one input device, and at least one output device.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. However, the disclosed methods should not be interpreted as reflecting the following intention: that the claimed invention requires more features than are expressly recited in each claim. More specifically, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Those skilled in the art should understand that a module or unit or component of a device in the examples disclosed herein can be arranged in the device as described in the embodiment, or alternatively can be positioned in one or a plurality of devices different from the device in the example. The modules in the foregoing examples can be combined into one module, or can be additionally divided into a plurality of sub-modules.

Those skilled in the art may appreciate that the modules in the device in the examples can be adaptively altered and disposed in one or more devices different from the embodiment. The modules, units, components of the embodiments may be combined into one module, unit, or component, and further may be divided into a plurality of sub-modules, sub-units, or sub-components. Unless at least some of such features and/or procedures or units that are mutually exclusive, all of the features disclosed in the description (including the accompanying claims, abstract, and drawings) and all of the procedures or units of any method or device disclosed as such may be combined using any combination. Unless explicitly stated otherwise, each feature disclosed in the description (including, the accompanying claims, abstract, and drawings) may be replaced by an alternative feature serving the same, equivalent, or similar objective.

Furthermore, those skilled in the art may appreciate that although some embodiments described herein include some features but not other features included in other embodiments, a combination of the features of different embodiments is indicative of falling within the scope of the present invention and forming a different embodiment. For example, in the following claims, any one of the claimed embodiments can be used in any combination.

In addition, some of the embodiments are described herein as a combination of methods or method elements that can be implemented by a processor of a computer system or by other apparatuses executing the function. Therefore, a processor having the necessary instructions for implementing the method or the method element forms an apparatus for implementing the method or the method element. Furthermore, the element of an apparatus embodiment described herein is an example of an apparatus for implementing the function performed by the element for the purpose of implementing the invention.

As used herein, unless otherwise specified, the use of the ordinal adjectives "first," "second," and "third" to describe a common object merely indicates that different instances of similar objects are being referred to, and are not intended to imply that the objects so described must be in a given sequence, either temporally, spatially, in ranking, or in any other manner.

While the invention is described with respect to a limited number of embodiments, those skilled in the art, having benefit of the above description, may understand that other embodiments can be devised without departing from the scope of the present invention as described herein. In addition, it should be noted that the language used in the description is principally selected for readability and instructional purposes, and may not have been selected to delineate or circumscribe the subject matter of the present invention. Therefore, without departing from the scope and the spirit of the appended claims, many modifications and variations will be apparent for those of ordinary skills in the art. For the scope of the present invention, the disclosure of the present invention is illustrative but not limiting; and the scope of the present invention is defined by the appended claims.

The invention claimed is:

1. An instruction processing apparatus, comprising:
a first register, adapted to store first source data;
a second register, adapted to store second source data;
a third register, adapted to store accumulated data;
a decoder, adapted to receive and decode a multiply-accumulate instruction, the multiply-accumulate instruction indicating:
the first register, serving as a first operand;
the second register, serving as a second operand;
the third register, serving as a third operand; and
a shift flag; and
an execution unit, coupled to the first register, the second register, the third register, and the decoder, and configured to:
execute the decoded multiply-accumulate instruction so as to acquire the first source data from the first register and acquire the second source data from the second register;
perform a multiplication operation on the first source data and the second source data so as to obtain a multiplication result, wherein the multiplication operation is performed by a multiplier of the execution unit;
shift the multiplication result, obtained from the multiplier, according to the shift flag; and
send the shifted multiplication result to an adder, wherein the adder adds the shifted multiplication result and accumulated data in the third register so as to obtain a multiply-accumulate result.

2. The instruction processing apparatus according to claim 1, wherein the shift flag indicates a number of shifts, and wherein the execution unit is configured to shift the multiplication result from a high bit to a low bit, a number of shifted bits being the number of shifts indicated by the shift flag.

3. The instruction processing apparatus according to claim 2, wherein a most significant bit of the multiplication result is a sign bit, and the execution unit is configured to, when shifting the multiplication result, add a value of the sign bit to the most significant bit of the multiplication result each time a bit is shifted.

4. The instruction processing apparatus according to claim 2, wherein the multiplication result is an unsigned number, and wherein the execution unit is configured to, when shifting the multiplication result, add a value of 0 to a most significant bit of the multiplication result each time a bit is shifted.

5. The instruction processing apparatus according to claim 1, wherein the execution unit is configured to store the multiply-accumulate result to the third register so as to replace the accumulated data.

6. The instruction processing apparatus according to claim 1, further comprising a fourth register, configured to store the multiply-accumulate result, wherein the multiply-accumulate instruction further indicates that the fourth register is a fourth operand, and wherein the execution unit is configured to store the multiply-accumulate result to the fourth register.

7. The instruction processing apparatus according to claim 1, wherein the multiply-accumulate instruction further indicates a negation flag, and wherein the execution unit is configured to, before shifting the multiplication result, perform negation processing on the multiplication result according to a value of the negation flag.

8. The instruction processing apparatus according to claim 1, wherein the multiply-accumulate instruction further indicates a selection flag, wherein the execution unit adds the shifted multiplication result and the accumulated data in the third register so as to obtain the multiply-accumulate result, and wherein the execution unit directly uses the shifted multiplication result as the multiply-accumulate result according to a value of the selection flag.

9. The instruction processing apparatus according to claim 1, wherein the first source data, the second source data, the accumulated data, and the multiply-accumulate result are vector data.

10. The instruction processing apparatus according to claim 1, wherein the multiply-accumulate result is configured to be a saturated value when the multiply-accumulate result indicates that an overflow has occurred.

11. The instruction processing apparatus according to claim 1, wherein a length of the multiply-accumulate result and the accumulated data is a sum of a length of the first source data and a length of the second source data.

12. An instruction processing method, comprising:
  receiving and decoding a multiply-accumulate instruction, the multiply-accumulate instruction indicating that a first register is a first operand, a second register is a second operand, a third register is a third operand, and a shift flag;
  executing the decoded multiply-accumulate instruction so as to acquire first source data from the first register and acquire second source data from the second register;
  performing a multiplication operation on the first source data and the second source data so as to obtain a multiplication result from a multiplier;
  shifting the multiplication result, obtained from the multiplier, according to the shift flag and sending the shifted multiplication result to an adder; and
  adding the shifted multiplication result and accumulated data in the third register, by the adder, so as to obtain a multiply-accumulate result.

13. The instruction processing method according to claim 12, wherein the shift flag indicates a number of shifts, and the shifting comprises shifting the multiplication result from a high bit to a low bit, a number of shifted bits being the number of shifts indicated by the shift flag.

14. The instruction processing method according to claim 13, wherein a most significant bit of the multiplication result is a sign bit, and the shifting comprises: when the multiplication result is shifted, adding a value of the sign bit to the most significant bit of the multiplication result each time a bit is shifted.

15. The instruction processing method according to claim 13, wherein the multiplication result is an unsigned number, and the shifting comprises: when the multiplication result is shifted, adding a value of 0 to a most significant bit of the multiplication result each time a bit is shifted.

16. The instruction processing method according to claim 12, wherein the executing the decoded multiply-accumulate instruction comprises storing the multiply-accumulate result to the third register so as to replace the accumulated data.

17. The instruction processing method according to claim 12, wherein the multiply-accumulate instruction further indicates that a fourth register is a fourth operand, and the executing the decoded multiply-accumulate instruction comprises storing the multiply-accumulate result to the fourth register.

18. The instruction processing method according to claim 12, wherein the multiply-accumulate instruction further indicates a negation flag, and the executing the decoded multiply-accumulate instruction comprises:
  before shifting the multiplication result, performing negation processing on the multiplication result according to a value of the negation flag.

19. The instruction processing method according to claim 12, wherein the multiply-accumulate instruction further indicates a selection flag, and the adding the shifted multiplication result and accumulated data in the third register so as to obtain the multiply-accumulate result comprises:
  directly using the shifted multiplication result as the multiply-accumulate result according to a value of the selection flag.

20. The instruction processing method according to claim 12, wherein the first source data, the second source data, the accumulated data, and the multiply-accumulate result are vector data.

21. The instruction processing method according to claim 12, wherein the executing the decoded multiply-accumulate instruction comprises: when the multiply-accumulate result indicates that an overflow has occurred, configuring the multiply-accumulate result to be a saturated value.

22. A computing system, comprising:
  a memory; and
  a processor, coupled to the memory, and comprising:
    a register set, comprising a first register adapted to store first source data, a second register adapted to store second source data, and a third register adapted to store accumulated data;
    a decoder, configured to receive and decode a multiply-accumulate instruction, the multiply-accumulate instruction indicating that:
  the first register is a first operand, the second register is a second operand, the third register is a third operand, and a shift flag; and
    an execution unit, coupled to the first register, the second register, the third register, and the decoder, and configured to:
      execute the decoded multiply-accumulate instruction so as to acquire the first source data from the first register and acquire the second source data from the second register;
      perform a multiplication operation on the first source data and the second source data so as to obtain a multiplication result,
    wherein the multiplication operation is performed by a multiplier of the execution unit; and
      shift the multiplication result, obtained from the multiplier, according to the shift flag and send the shifted multiplication result to an adder, wherein the adder adds the shifted multiplication result and the accumulated data in the third register so as to obtain a multiply-accumulate result.

23. A non-transitory machine-readable storage medium, wherein the non-transitory machine-readable storage medium comprises code which, when executed, enables a machine to execute the method according to claim 12.

24. A system on chip, comprising the instruction processing apparatus according to claim 1.

* * * * *